US006189586B1

(12) United States Patent
Guidry

(10) Patent No.: US 6,189,586 B1
(45) Date of Patent: Feb. 20, 2001

(54) PNEUMATIC RUBBER TIRE FOR ON/OFF-ROAD VEHICLES

(76) Inventor: Warren L. Guidry, P.O. Drawer 6, Rayne, LA (US) 70578

( * ) Notice: Under 35 U.S.C. 154(b), the term of this patent shall be extended for 0 days.

(21) Appl. No.: 09/173,016

(22) Filed: Oct. 15, 1998

(51) Int. Cl.[7] ............................ B60C 11/01; B60C 11/11; B60C 11/12; B60C 107/00; B60C 121/00
(52) U.S. Cl. .............................. 152/209.15; 152/209.16; 152/209.18; 152/209.22; 152/523; 152/902; 152/DIG. 3
(58) Field of Search ............... 156/110.1; 152/209.2, 152/209.3, 209.16, 209.18, 209.21, 209.22, 902, DIG. 3, 523, 209.15; D12/152

(56) References Cited

U.S. PATENT DOCUMENTS

| D. 127,818 | * | 6/1941 | Shively ........................... D12/152 |
| D. 187,575 | * | 3/1960 | Caurette ........................ 152/209.15 |
| D. 261,257 |   | 10/1981 | Guidry . |
| D. 308,038 |   | 5/1990 | Guidry . |
| D. 345,950 |   | 4/1994 | Guidry . |
| D. 358,792 |   | 5/1995 | Guidry . |
| D. 383,426 |   | 9/1997 | Guidry . |
| 1,458,629 | * | 6/1923 | Raymond ............................ 152/523 |
| 1,504,694 | * | 8/1924 | Litchfield ...................... 152/209.22 |
| 1,956,011 | * | 4/1934 | Evans ................................ 152/209.3 |
| 2,572,259 | * | 10/1951 | Gottschall ........................... 152/523 |
| 3,196,920 | * | 7/1965 | Fishman ........................ 152/209.22 |
| 3,584,670 | * | 6/1971 | Verdier ................................ 152/902 |
| 3,645,314 | * | 2/1972 | Verdier ................................ 152/902 |
| 3,707,177 | * | 12/1972 | Boileau ............................... 152/902 |
| 3,825,052 |   | 7/1974 | Matsuyama et al. . |
| 4,043,372 |   | 8/1977 | Miyoshi et al. . |
| 4,319,618 |   | 3/1982 | Suzuki . |
| 4,442,618 | * | 4/1984 | Minter et al. ....................... 152/523 |
| 5,085,259 | * | 2/1992 | Goergen et al. .................... 152/902 |
| 5,188,683 | * | 2/1993 | Bonko ............................ 152/209.16 |
| 5,456,301 | * | 10/1995 | Wise .............................. 152/209.15 |
| 5,580,404 | * | 12/1996 | Hitzky ............................ 152/209.22 |
| 5,957,180 | * | 9/1999 | Kuramochi et al. ............ 152/209.21 |

FOREIGN PATENT DOCUMENTS

| 495727 | * | 9/1953 | (CA) ............................... 152/209.18 |
| 744448 | * | 2/1956 | (GB) ............................... 152/209.18 |
| 755137 | * | 8/1956 | (GB) ............................... 152/209.18 |
| 62-286805 | * | 12/1987 | (JP) ................................. 152/DIG. 3 |
| 63-305009 | * | 12/1988 | (JP) ............................... 152/209.18 |
| 1-141105 | * | 6/1989 | (JP) ............................... 152/209.18 |
| 2-182505 | * | 7/1990 | (JP) ............................... 152/209.15 |
| 4-252709 | * | 9/1992 | (JP) ............................... 152/209.15 |
| 5-319022 | * | 12/1993 | (JP) ............................... 152/209.16 |

\* cited by examiner

Primary Examiner—Steven D. Maki
(74) Attorney, Agent, or Firm—Robert N. Montgomery

(57) ABSTRACT

An aggressive on/off-road pneumatic tire tread design for recreational vehicles which is highly durable, self cleaning, improves rolling resistance on paved roads, has excellent tread wear characteristics, and is relatively quiet on paved roads. The tread design includes a side wall tread portion including a scuff bar and the area between it and the ground contacting tread is further provided with raised emblems and distinctive markings which provide traction and reduce mud caking, The tire's tread includes a pair of parallel rows of opposing chevron shaped lugs, defining a zigzag channel therebetween, and an outer row of polyhedron shoulder lugs outboard of the chevron rows, the polyhedron lugs being three different sizes, a short, intermediate and long, sequentially arranged in sets of three with a short lug between each long and intermediate lug. Root risers in the lateral channel between each chevron shaped lug are provided to prevent stress crack running in the tread. Each chevron lug ground contacting face includes a closed chevron sipe and step shoulders. Each chevron shaped lug further including a recessed notched portion and a corresponding protrusion on opposite sides of the lug adjacent the syncline and anticline sides to help break up mud caking in the lateral channels.

14 Claims, 5 Drawing Sheets

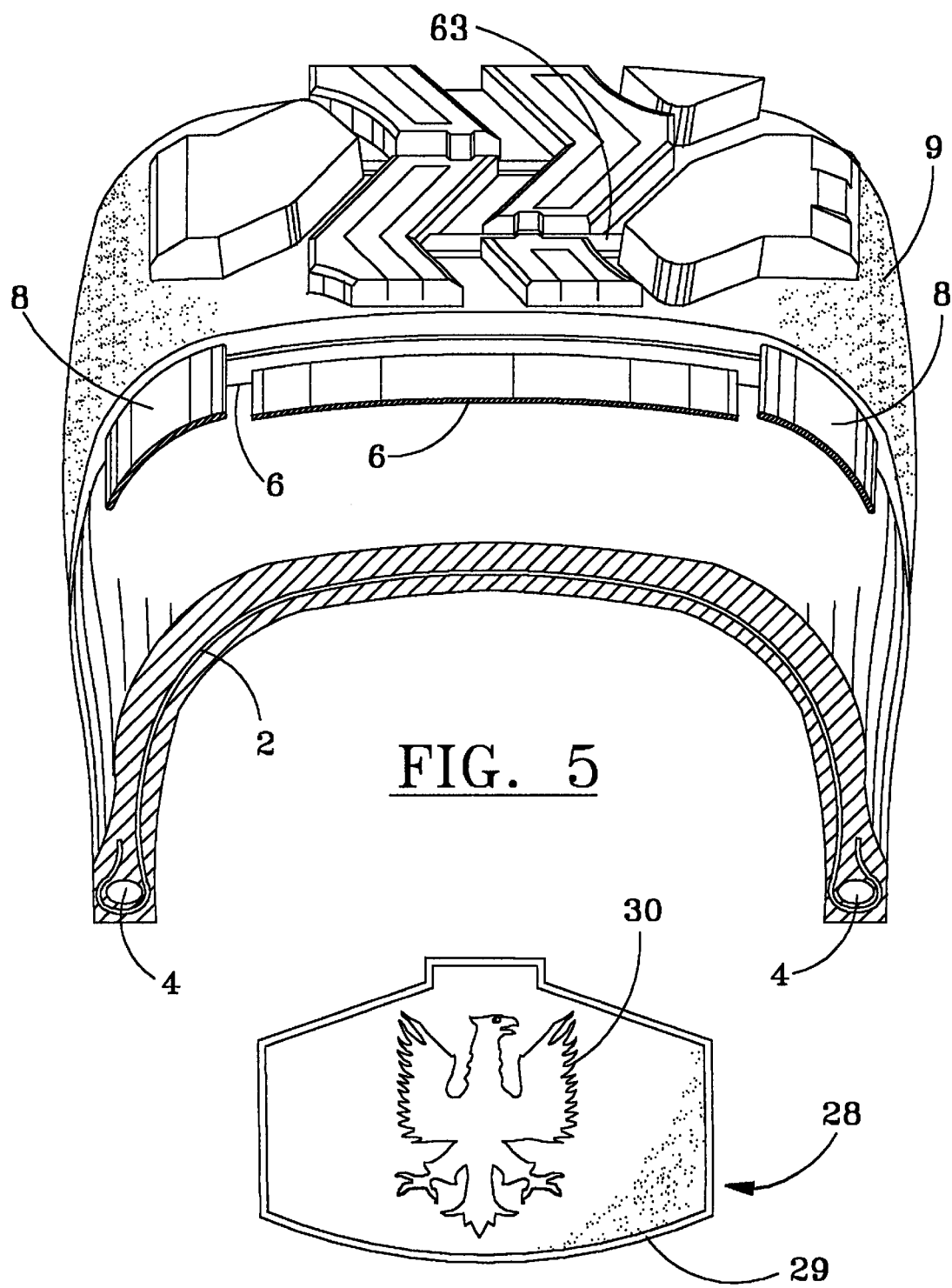

PNEUMATIC RUBBER TIRE FOR ON/OFF-ROAD VEHICLES

BACKGROUND OF THE INVENTION

1. Field of the Invention

This invention relates to a pneumatic tire, and more particularly to a pneumatic tire for off-road vehicles, such as recreational vehicles utilizing 4-wheel drive on rough terrain.

2. General Background

Pneumatic tires used for off road recreational vehicles are susceptible to side wall cuts and cracks on the outer surface of the tire due to rocks, stumps, etc., usually encountered in off-road driving. Such off-road driving often subjects the vehicle and its tires to destructive conditions which brutalizes the tires, such as frequent bogs which subject the tire to high heat and casing cord breaking stresses due to pry bars, etc., being forced into contact with the spinning wheel. Mud adhering to the tire is also a problem. When mud builds up on the vehicle tire and packs the tire well, it can cause skidding, steering problems and increase heat on the tire. Such tires must have heavy outer layers of rubber to prevent breaking the tire cording and belting members and provide excellent traction, including good side wall adhesion in bog conditions. Further, when such vehicles return to paved or hard packed roads, it is essential that the tires be self-cleaning and be capable of running at highway speeds without wiggle, bounce or high noise factor. Several types of off-road recreational vehicle tires have been developed which address the need for aggressive traction, some of which are disclosed by my U.S. design patents D383426, D261257, D308038, D345950 and D358792. Others have disclosed reinforced or protected side wails and double caisson cores such as disclosed by U.S. Pat. Nos. 3,825,052, 4,043,372, and 4,319,618. However, today's all terrain vehicle (ATV) and recreational vehicle (RV) markets are requiring more than off road performance. Many ATV and RV owners are looking for styling which produces a quite smooth ride on road surfaces, reduces rolling resistance on paved roads thus improving fuel mileage, provides good tread wear at highway speeds and contributes to the overall appearance of the vehicle at an economical cost.

SUMMARY OF THE INVENTION

The instant invention provides an aggressive off-road pneumatic tire tread design of radial or biased construction which is highly durable, self cleaning, improves rolling resistance on paved roads, has excellent tread wear characteristics, and is relatively quiet on paved roads. The tire includes a strong nylon or polyester bias ply body with duel belts under the tread and lugs, a portion of which extends beyond the tread running plane into the curved area between the ground contacting tread and the side wall scuff bar. The side wall scuff bar and the area between it and the tread is further provided with raised emblems and distinctive markings, also having relief therein, located in radial alignment with the tread lugs. Such side wall markings further serve as part of the overall tread design by increasing traction in mud and help to break up caked mud which tends to cling to this portion of the tire, thereby marring the esthetic and general overall appearance of the tire. Raised side wall markings also help protect the side wall and further provide extra traction when climbing out of ruts. The tire's tread includes a pair of parallel rows of opposing chevron shaped lugs, the chevron's syncline sides opposing with portions of the syncline side of chevron lugs located opposite the EP and extending outwards towards the side walls, the lug rows orientated in a circumferential direction and parallel to the equatorial plane of the tire, thus providing a zigzag groove between the syncline sides of the chevron shaped lugs radially along the equatorial plane of the tire. The tire tread also has an outer row of polyhedron lugs outboard of the chevron rows located either side of the equatorial plane. The polyhedron lugs being three different sizes short, intermediate and long sequentially arranged in sets of three with a short lug between each long and intermediate lug. Each polyhedron lug is orientated so as to define a channel therebetween with the anticline sides of a pair of chevron lugs. Each polyhedron lug has a rectangular portion and an offset portion arranged perpendicular to the equatorial plane. Each lug also has one or more beveled outer shoulders and large radii at the intersection of the lug with the tire side wall, the offset portion of each lug being orientated either positive or negative relative to the equatorial plane. The polyhedron lugs being further orientated whereby the lugs on one side of the equatorial plane are offset from their opposite number on the opposite side of the plane, a portion of two of the polyhedron lugs extending substantially into the side wall area beyond the remaining lugs. Circumferential spacing of the polyhedron lugs is at least 50% greater than the space between the polyhedron lug and the chevron lug, thus insuring positive movement and extrusion of mud. The positioning relationship between the polyhedron lugs and the chevron lugs results in a zigzag channel running circumferentially around the tire perimeter.

The chevron lugs have root risers in the lateral channel between each chevron shaped lug to prevent stress crack running in the tread. Each chevron lug surface face includes a closed chevron sipe and step shoulders on both the syncline sides. Each chevron shaped lug further included an recessed notched portion and a corresponding protrusion on opposite sides of the lug adjacent the syncline and anticline sides to help break up mud caking in the lateral channels.

It is therefore an object of the present invention to provide a tire that is relatively quiet with excellent off-road traction and self-cleaning characteristics.

It is a further object of the invention to provide a tire having excellent wear factor with improved esthetics.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 5 is a cut-a-way cross section view of the illustration of FIG. 4;

FIG. 6 is a close-up view of the emblem illustrated in FIG. 2;

DETAILED DESCRIPTION OF THE PREFERRED EMBODIMENT

Figure 1:
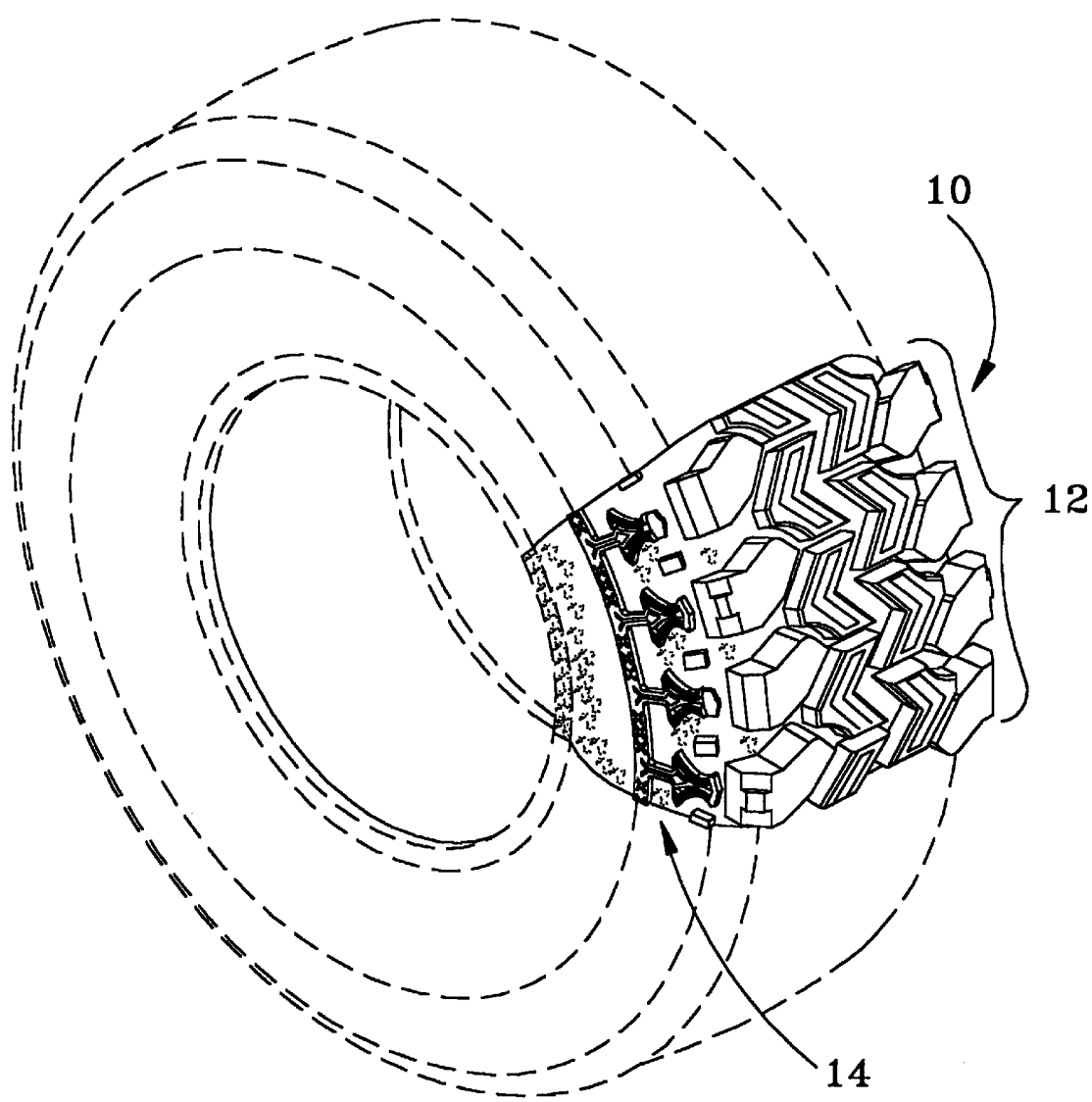
FIG. 1 is an isometric view of the preferred embodiment illustrating a partial view of the tread and side wall pattern.

Pneumatic radial tires are defined as having substantially parallel cords 2 extending from bead 4 to bead 4, usually laid at a cord angle of 75° and 90° relative to the equatorial plane (EP) of the tire as seen in FIG. 5 and generally defines the tire core structure. Two or more steel belts 6 and special fabric cording 8 provide the underlayment for radial tires prior to applying the tread material 9 which includes the tread pattern lugs 10 best illustrated in FIG. 1.

The EP as used herein refers to a plane perpendicular to a tire's axis of rotation and passing through the center of its tread midway between the side walls of the tire. The terms "radial" and "radially" refer to directions that are perpendicular to the axis of rotation of a tire, the terms "axial" and "axially" arc used herein to refer to lines or directions that are parallel to the axis of rotation of a tire and the terms "lateral" and "laterally" are understood to refer to directions perpendicular to the equatorial plane. "Groove" means an elongated void area in a tread that may extend circumferentially or laterally in the tread in a straight, curved or zigzag manner. A "sipe" is a groove typically formed by steel blades, having a width of 0.4 to 1.6 mm, inserted into a cast or machined mold.

Figure 2:
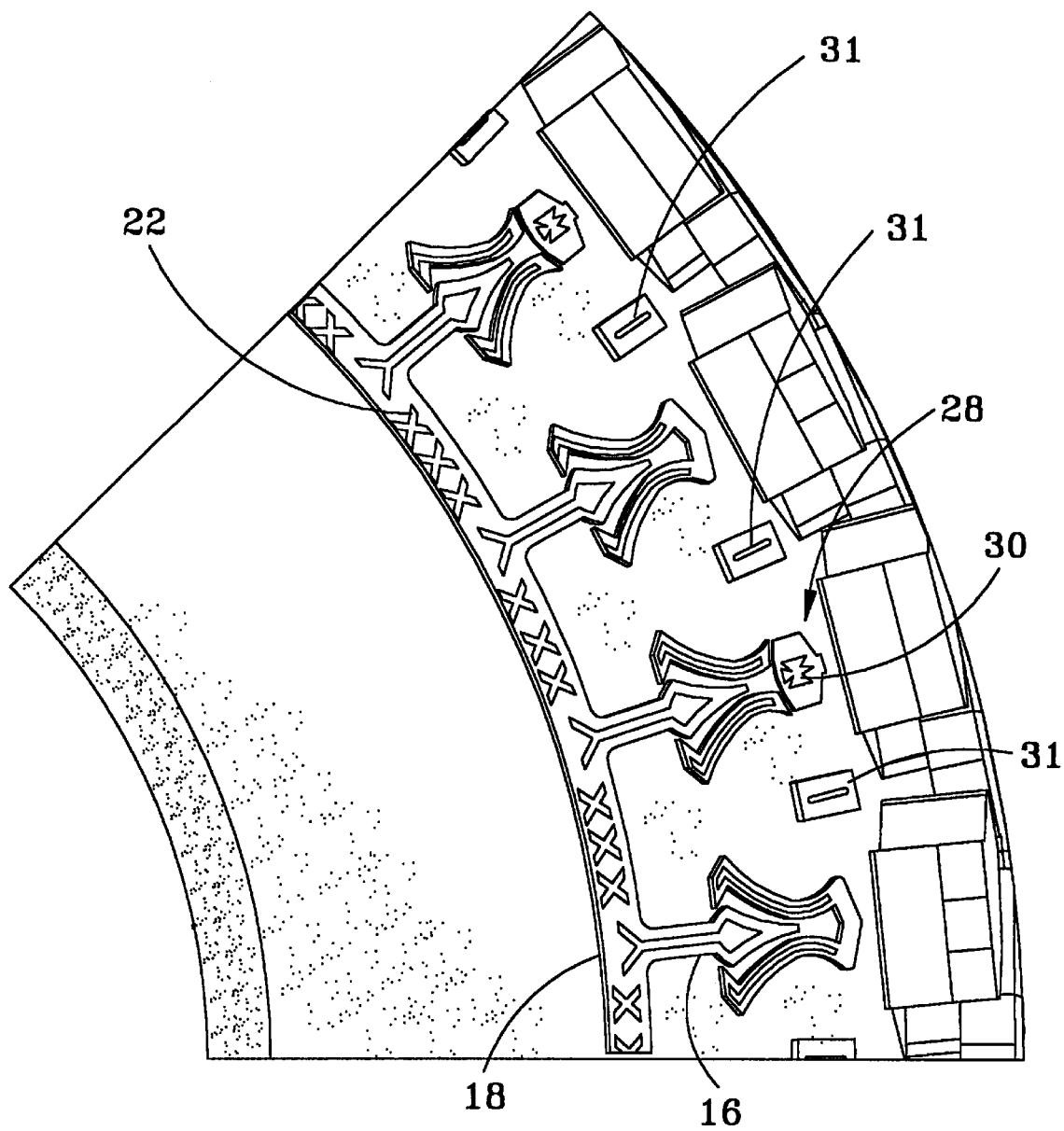
FIG. 2 is a partial close-up side elevation view of the side wall.
Figure 3:
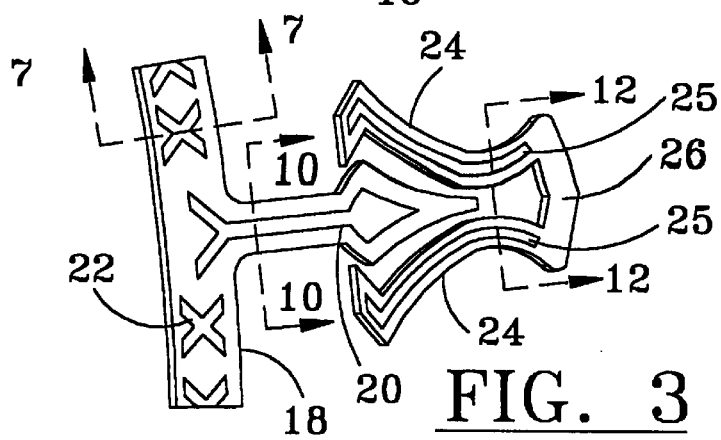
FIG. 3 is a close-up view of the one of the symbols illustrated in FIG. 2.
Figure 7:
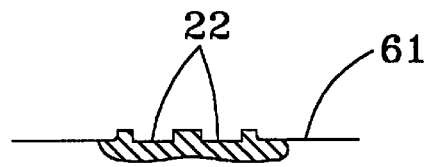
FIG. 7 is a partial cross section of the scuff bar taken along sight lines 7—7 seen in FIG. 3.
Figure 10:
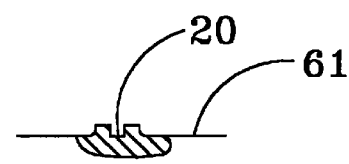
FIG. 10 is a partial cross section taken along sight line 10—10 seen in FIG. 3.
Figure 12:
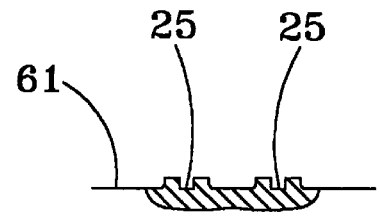
FIG. 12 is a partial cross section taken along sight line 12—12 seen in FIG. 3

The instant tire configuration 10, a portion of the tread pattern of which is first illustrated in FIG. 1, is representative of a four lug series 12 which is repetitious around the circumference of the tire. Although lug spacing and size change with the diameter of the tire, the pattern and lug sequence remains constant, including the side wall symbol pattern 14 and its location relative to specific adjacent lugs. As better seen in FIG. 2, the side wall symbols 14 are comprised of repetitious raised arrows 16 extending upwards from the scuff bar 18. Each arrow 16 contains a smaller arrow symbol 20 in the form of a groove shown in cross section in FIG. 10. The scuff bar contains a series of three "x" marks 22 in the form of grooves, shown in cross section in FIG. 7, located between each arrow symbol 20. The pointed end of each arrow symbol 16 is bracketed by an accentuating curved bodies also having relief grooves 25. These bodies 24, as better seen in FIG. 3, are connected at one end by a connecting bar 26 shown in cross section in FIG. 12 or a shield 28 having an embossed logo of an eagle 30 in relief as illustrated in FIG. 6. The shield 28 seen in greater detail in FIG. 6 is alternated on every other set of curved bodies 24. The shield 28 is formed by a raised ridge surrounding a raised eagle silhouette 30 having extended wings and three claws. A raised block lug 31, also having a relief groove, is located midway between each arrow 16, The relief groove for the "X" marks 22 are illustrated in FIG. 7 and the relief groove for the arrow 20 and the curved bodies 24 are illustrated in FIGS. 10 and 12 respectively. These raised markings further help provide traction and help breakup clay, which tends to cling to this portion of the tire, and are therefore considered as part of the tread design and referred to herein as side wall tread.

Figure 4:
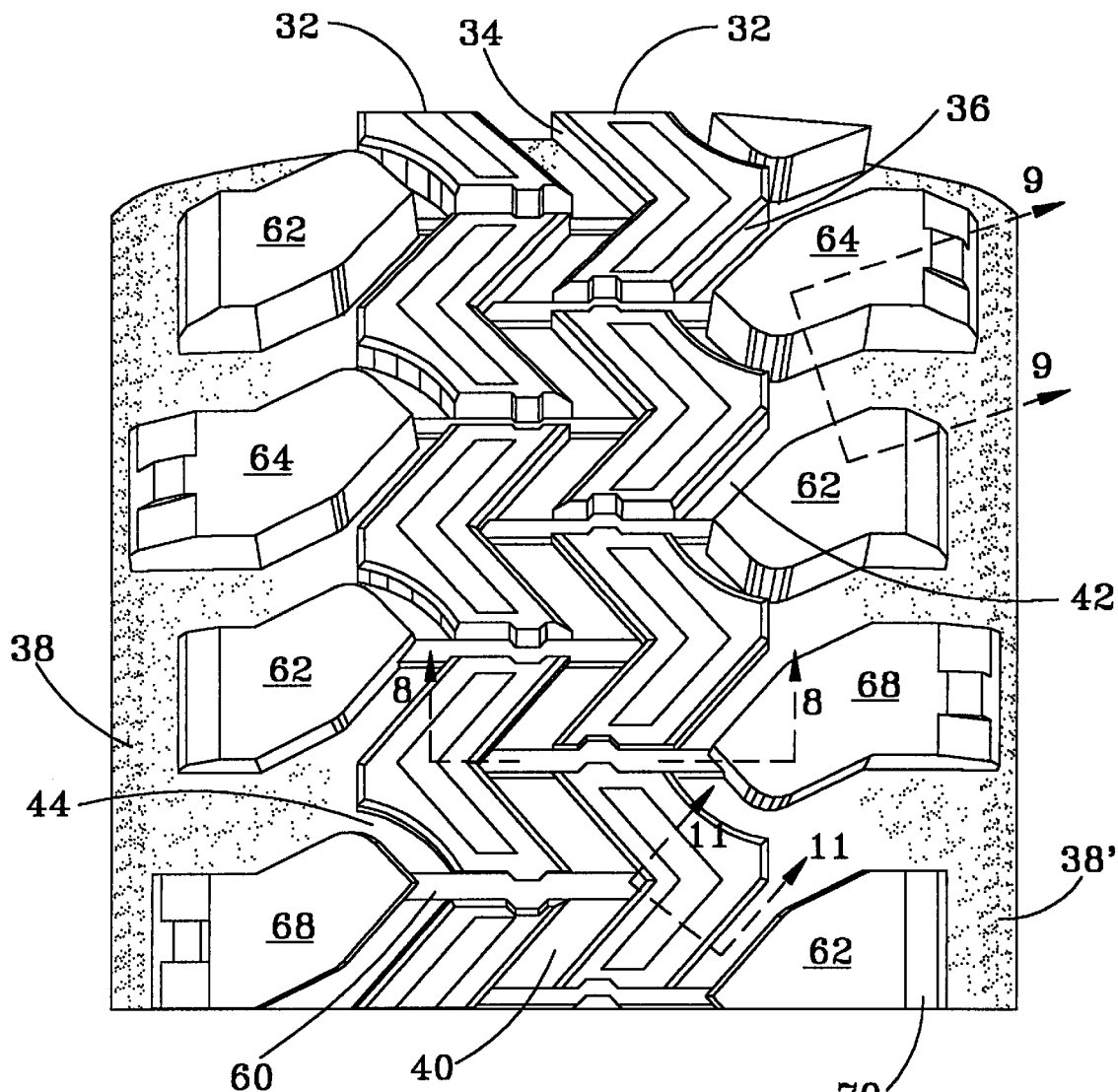
FIG. 4 is a partial front radial elevation of the tire illustrating the lug pattern.
Figure 4A:
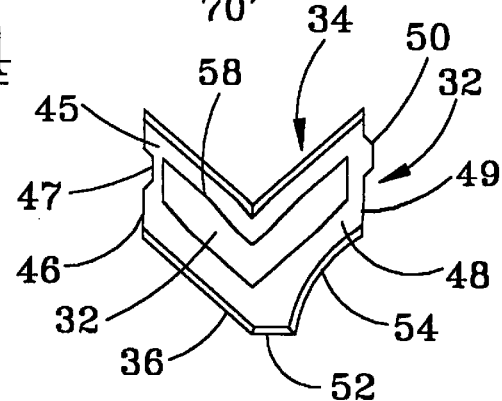
FIG. 4A is an expanded plan view of the chevron lug block.
Figure 8:
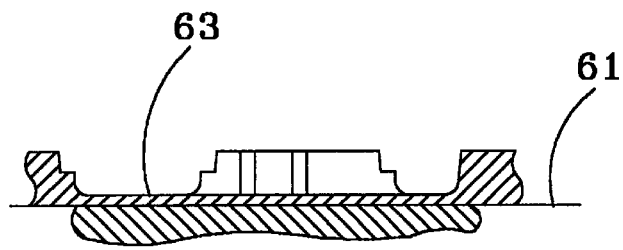
FIG. 8 is a partial cross section taken along sight line 8—8 seen in FIG. 4.
Figure 11:
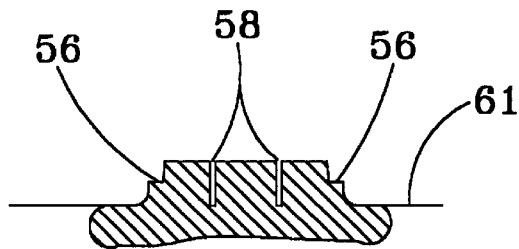
FIG. 11 is a partial cross section taken along sight line 11—11 seen in FIG. 4.

Turning now to FIG. 4, we see the tread pattern comprises two rows of chevron shaped lugs 32, each lug having a syncline 34 side and anticline or pointed side 36. The opposing chevron lugs 32 are nested or intermeshed in such a manner that the syncline side 34 of each chevron 32 is perpendicular to the equatorial plane (EP) with its pointed or anticline side 36 extending towards the side walls 38, 38' and with a portion of two adjacent chevron lugs 32 located on one side of the EP intermeshing or nesting within the syncline geometry of a single chevron lug 32 located opposite the EP but in a manner which defines grooves 40, 42, and 44 between each of the three chevrons involved. Each of the chevron shaped lugs 32 is further defined as including a left and right wing portion, the left wing portion 45 having a side 46 extending from the syncline side 34 to the anticline side 36 having a notch or recess 47 therein, the opposite or right wing 48 including a side 49 having a projection 50. The recess 47 and the projection 50 are identical in size and shape. Lug 32 further including a blunt point 52 and curved portion 54 of the right wing 48 which defines the anticline side 36 of the chevron. The lug 32 includes a step 56 along the upper or ground contacting surface edge of the lug and runs continuously along the syncline and anticline sides 34, 36, as defined in profile in FIG. 11. The chevron lug 32 also contains sipes 58 as also seen in FIG. 11. It should be noted that these sipes 58 form closed loops as seen in FIG. 4A. A lateral channel 60 extends from the syncline 34 of each chevron lug 32 to and intersects with one of the polyhedron lugs 62–66 located directly opposite the chevron lug 32. This channel 60 seen in FIG. 4, passes between each chevron wing 45, 48 and does not extend to the tread base line 61 as seen in cross section in FIG. 8, thus forming a channel ridge 63 which extends from the root of each chevron syncline side 34 to the tip of one of polyhedron lugs 62, 64, 68. These ridges 63 serve as mud breakers and further prevent stress cracking which tends to run along the tread base line 61 between the lugs 32 and 62–68. The notches 47 and projections 50 on each wing 45, 48 of adjacent chevron lugs 32 tend to help break mud by producing and irregular edge which also tends to flex and expand towards each other under extreme heat and stress.

Figure 9:
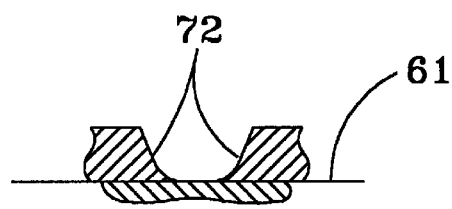
FIG. 9 is a partial cross section taken along sight line 9—9 seen in FIG. 4.

The three polyhedron shoulder blocks or lugs 62, 64, 68 as illustrated in FIG. 4 have seven sides, two of which are equal and having two adjacent sides defining a radius therebetween, the upper surface having one or more bevels at different angles along one side, the polyhedron's radius always being located opposite the curved portion 54 of the chevron lug 32. This insures a smooth flow transition of extruded mud between the lugs. Each of the lugs 62, 64 and 68 are generally the same shape but have different overall lengths and are referred to as short, intermediate and long polyhedron lugs with only the face bevels being somewhat different. These juxtaposed lugs 62, 64, 68 are arranged in repetitious sequence of four in the following order; short 62, long 68, short 62 and intermediate 64. This insures that each long lug 68 and intermediate lugs 64 is separated by a short lug 62. The short lugs 62 have a single bevel 70, seen in FIG. 4, along the side wall side, whereas intermediate and long lugs 64 have three bevels, two of which are at different angles from the third. The polyhedron lugs 62, 64, 68 all have sloping sides which form relatively large radius 72 at their intersection with the base line 61 as seen in FIG. 9.

The polyhedron lugs 62, 64, 68 on one side of the EP are considered as positive bight, whereas lugs located on the opposite side of the EP are negative bight, making the tire bi-directional and thus allowing the tire to be mounted from either side. It should be noted that both halves of the tire divided by the EP reflect the same negative impression, therefore, when their obverse sides are placed back to back and shifted radially one half the width of the chevron lug, we obtain a very aggressive tread pattern in combination with much greater surface contact. This combination provides for long wear, low noise and vibration with excellent mud breaking capability.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A pneumatic radial rubber tire for combination on/off road recreational vehicles including a carcass body composed of a plurality of rubberized ply layers superimposed one upon the other containing bias cording and belting, said body having a ground contacting tread portion and a side wall tread portion, said tread portions comprising:

a) tread lugs having a plurality of chevron shaped lugs defined as a geometric figure having a syncline side an anticline side and parallel sides connecting said syncline side and said anticline side, said anticline side having a blunt peak thereby forming three side faces one of which is an inward arcuate shaped side face, each said chevron shaped lug having a notched portion and a corresponding projection portion located on opposite sides adjacent their syncline side, b) a plurality of elongated polyhedron shaped lugs a portion of which being at an oblique angle, each of said polyhedron shaped lugs being interposed mesial and adjacent each said anticline side of each of said chevron lugs, each said polyhedron lug having at least two sides which are of equal length, and two sides defining a radius therebetween, converging sides and said radius located opposite and generally corresponding to said arcuate shaped side face of one of said chevron shaped lugs, each of said polyhedron shaped lugs having a ground contacting portion surface edge step along at least one said syncline and anticline side, and at least one acute bevel along one side of said polyhedron lug located adjacent said side wall, said bevel being less than the height of said polyhedron shaped lug; and c) a side wall tread located adjacent and either side of said ground contacting tread, said tread lugs comprising a scuff bar and a plurality of raised portions extending therefrom defining symbols in relief, said raised portions spaced relative to and extending towards said polyhedron lugs.

2. The pneumatic rubber tire according to claim 1 wherein said chevron shaped lugs further comprise at least one ground contacting surface edge step along at least one said syncline and anticline side.

3. The pneumatic rubber tire according to claim 1 wherein each of said chevron shaped lugs further comprise a closed loop chevron shaped sipe located in said ground contacting surface of said chevron shaped lug.

4. The pneumatic rubber tire according to claim 1 wherein said tire is divided radially into left and right sides of an equatorial plane perpendicular to the axle axis of the tire and wherein said chevron lugs are located adjacent to said equatorial plane in a manner wherein said blunt peak is perpendicular to said equatorial plane.

5. The pneumatic rubber tire according to claim 4 wherein a first row of said chevron lugs are located to the left of said equatorial plane and adjacent each other, defining channels therebetween, said chevron lugs being equally spaced circumferentially around the perimeter of said tire.

6. The pneumatic rubber tire according to claim 5 wherein a second row of said chevron lugs are located to the right of said equatorial plane and adjacent each other, defining channels therebetween, said chevron lugs of said second row being equally spaced circumferentially around the perimeter of said tire.

7. The pneumatic rubber tire according to claim 6 wherein said second row of said chevron lugs is offset from said first row by half the width of said lug in a manner defining a zigzag circumferential groove between the syncline sides of the opposing chevron lugs.

8. The pneumatic rubber tire according to claim 6 wherein the anticline sides of said chevron lugs on each side of the equatorial plane define a zigzag circumferential groove between said chevron lugs and said polyhedron lugs.

9. The pneumatic rubber tire according to claim 8 wherein the spacing between said polyhedron lugs is at least 50 percent greater than the space between said polyhedron lugs and said chevron lugs.

10. The pneumatic rubber tire according to claim 5 wherein said channel between said chevron lugs of said first row further defines a raised ridge which extends transversely, intersecting with the convergence of said chevron syncline side at each of said chevron lugs in said second row and with one of said polyhedron lugs.

11. The pneumatic rubber tire according to claim 10 wherein said polyhedron lugs are located opposite said chevron lugs in a manner wherein said acute bevel side is parallel with said side wall tread portion and one of said two sides of said polyhedron lug defining a radius therebetween is located directly opposite said inward arcuate face of said anticline side of a respective chevron lug.

12. The pneumatic rubber tire according to claim 11 wherein said polyhedron lugs are arranged in rows, each row of polyhedron lugs comprising a sequences of short, intermediate and long lugs, equally spaced circumferentially around the perimeter of said tire, said sequence comprising one short polyhedron lug mesial said long and intermediate polyhedron lugs.

13. The pneumatic rubber tire according to claim 1 wherein said side wall tread portion, comprising said scuff bar and symbols are positioned in a manner whereby a symbol is spaced and in alignment with each said polyhedron lugs.

14. A pneumatic tire having a ground contacting tread portion and a side wall tread portion, said ground contacting tread portion comprising circumferentially extending zigzag grooves and laterally extending grooves defined by at least two circumferential offset rows of juxtaposed chevron shaped blocks having syncline and anticline sides, chevron shaped sipes, and first and second parallel sides, said first parallel side having a recess portion and said second parallel side having a projection portion, said chevron shaped blocks defining a central zigzag circumferential groove passing between opposing syncline sides of said chevron blocks and a single row of polyhedron shaped shoulder blocks and a row of said chevron shaped blocks defining an outer zigzag groove between said chevron shaped blocks and said polyhedron shaped shoulder blocks, with each lateral groove having a channel ridge extending from the syncline side of each said chevron block to the tip of each polyhedron shoulder lug, said polyhedron shoulder lugs being different lengths and arranged circumferentially in sets of three lugs comprising a long lug, and intermediate length lug separated in a spaced apart relationship by a short shoulder lug, said polyhedron shoulder lugs being orientated in a manner wherein said lugs on opposing shoulders face opposite directions, said side wall tread portion comprising raised blocks and symbols with relief extending upwards from a scuff bar, said symbols being in radial alignment with each said shoulder block.

* * * * *